United States Patent [19]

Wesch et al.

[11] 4,123,587

[45] Oct. 31, 1978

[54] METHOD OF MANUFACTURING A FINELY GRANULAR CONCENTRATE OF FIRE-RETARDING FOAM-FORMING SOLID ADDITION SUBSTANCES FOR PLASTICS, VARNISHES, COATING COMPOSITIONS, AND SIMILAR SUBSTRATES

[76] Inventors: Ludwig Wesch, Gorresstrasse 54, Heidelberg, Germany; Luis C. Roma, C/Montserrat 22, Sabadell; Carlos F. Pellicer, C/Balmes 454 s/a, Barcelona, both of Spain

[21] Appl. No.: 764,847

[22] Filed: Feb. 2, 1977

[30] Foreign Application Priority Data

Feb. 3, 1976 [ES] Spain .................................. 444.861

[51] Int. Cl.$^2$ ........................ C08K 9/06; B32B 31/00
[52] U.S. Cl. ........................ 428/407; 260/DIG. 24; 260/42.56; 427/221; 241/21; 241/22; 241/29; 252/8.1; 260/45.7 PH; 260/856; 260/830 TW
[58] Field of Search .................... 427/221, 212; 252/2, 252/8.1; 264/115, 118; 260/42.56, 2.5 AJ, 2.5 FP, DIG. 24; 241/21, 22, 29; 106/15 FP

[56] References Cited

U.S. PATENT DOCUMENTS

| | | | |
|---|---|---|---|
| 3,214,403 | 10/1965 | Peerman | 260/37 EP |
| 3,660,321 | 5/1972 | Praetzel | 252/8.1 X |
| 3,968,060 | 7/1976 | Vincent | 252/2 |

OTHER PUBLICATIONS

Defensive Publication – 909, O.G. 5, Apr. 3, 1973.

*Primary Examiner*—Sam Silverberg
*Attorney, Agent, or Firm*—Hopgood, Calimafde, Kalil, Blaustein and Lieberman

[57] ABSTRACT

A method is provided for producing a fine granular concentrate of fire-retarding, foam-forming solids for addition to host material including plastics, paints, coating compositions and the like by mixing particles of solid fire-retarding additives of particle size less than about 5μm with a polymeric material wherein the particles are surrounded and coated by said polymeric material, said polymeric material being compatible with or the same as the host material to which the coated particles are subsequently added to confer fire-retarding and foam-forming properties thereto. The steps include drying said polymeric-particle mixture, comminuting said polymeric-particle mixture to a granular product of less than about 50μm, and repeating the coating procedure at least one more time on said granular product by mixing said granular product with polymeric material, followed by drying and comminuting said granular-polymeric mixture to provide a granular concentrate having a size of less than about 50μm with an outer layer of said polymeric material, said polymeric material in at least the outer layer of granular concentrate being characterized by being capable of splitting off nitrogen and/or water under pyrolitic conditions.

18 Claims, No Drawings

METHOD OF MANUFACTURING A FINELY GRANULAR CONCENTRATE OF FIRE-RETARDING FOAM-FORMING SOLID ADDITION SUBSTANCES FOR PLASTICS, VARNISHES, COATING COMPOSITIONS, AND SIMILAR SUBSTRATES

The present invention relates to a method of producing a finely granular concentrate of fire-retarding, foam-forming solid addition agents for plastics, paints, coating compositions and similar substrates.

The invention furthermore concerns the use of the resultant finely granular concentrates as fireproofing agents, particularly in thermoplastic or thermosetting plastic moldings or coating compositions, including aqueous dispersion paints.

It is already known to incorporate in plastics or coating compositions consisting essentially of plastics, addition agents which, under pyrolitic conditions, split off nitrogen and/or water and/or form foam-like carbon structures by which the thermal conductivity is greatly reduced and the flame-retarding action of such addition agents is thus increased. As such additions, there are known, for instance, solid polyols such as pentaerythritol, nitrogen-containing compounds such as melamine, guanine, and urea, and also, particularly as foam-formers, ammonium phosphates and polyphosphates.

When using such substances in fire-retarding paints which ordinarily have a thickness of the coating agent of 0.2 to 0.7 mm, foam structures of a height of 5 to 10 mm are formed under conditions of pyrolitic decomposition. The degree of fireproofing in accordance with DIN 4102 corresponds on the average only to approximately classes F15 to F30, which is due not only to the relatively low height of foam but also to an irregular foam structure and poor mechanical strength, which is based on the required relatively high content of substances of fire-retarding or foaming action and their frequently insufficient compatibility with the plastic binders (due for instance to hydrophilic properties of the polyols). Furthermore, said paints or coating compositions are of poor resistance to the elements, due to the same reasons.

It has been found that these disadvantages can be avoided if the fire-retarding additions are brought, in accordance with the invention, into a specific shape of a finely granular concentrate which is compatible with the binder and assures a uniform distribution of the active substance upon introduction into the binder or plastic.

The method in accordance with the invention for the production of a finely granular concentrate of fire-retarding foam-forming solid addition substances for plastics, paints, coating compositions and similar substrates is characterized by the fact that the addition substances are reduced to a particle size of less than 5 $\mu$m, and coated with a polymeric material which is compatible with or identical to the coating composition, whereupon the coated mixture, possibly after being rolled down to a sheet, is dried at a temperature of less than 200° C and again reduced to a particle size of less than 50 $\mu$m and thereupon the coating, comminuting, and drying are repeated, possibly, another one or more times with the same or different polymeric material.

In particular, the finished concentrates should contain 30 to 90% by weight of the fire-retarding addition substances.

The production of granules of a coated concentrate from the fire-retarding addition agents prevents the premature separating out of such addition agents, as was the general case in the prior art as a result of different densities, and it thus assures the development of a uniform foam layer and thus of fire protection which is uniform at all places.

In accordance with one embodiment of the invention, the following procedure is employed.

The individual addition substances, including the foam-forming agents, are subjected to a milling for 12 to 24 hours, the size of the individual particles produced being less than 5 $\mu$m and preferably less than 1 $\mu$m. After the milling, the particles are coated with a known binder, such as a paint or plastic, and allowed to pass through a roll mill. The mass is then dried in a very thin layer, preferably under reduced pressure. The drying temperature should not be greater than 200° C and should preferably be 100° C.

After full dryness is reached, the mass is again subjected to a grinding process. The degree of fineness depends in this connection on the purpose of use. In the case of coating compositions which are to be applied in a thick layer, the powder produced by the grinding process can have a particle size of 5 to 10 $\mu$m on the average, and at most 50 $\mu$m. In this case, no strong damage to the surface of the materials occurs and the individual components of the active mixture are surrounded by a protective covering. When mixed into the coating material, the surrounded active particles of the fire-retarding addition substances remain at a predetermined distance apart and highly active.

Upon an increase in temperature above 500° C, the fire-retarding reactions take place substantially more rapidly and the conduction of heat is reduced already at a very early time. A considerable increase in fire resistance is obtained hereby as compared with normal mixing. Thus, coating compositions which were just suitable for the obtaining of fire protection class F30 can be placed in class F60.

In part, these values are further increased if the material obtained after the first covering is subjected to a second or third treatment.

In accordance with the invention, in order to increase the effectiveness of the concentrate, at least in the last outer layer, there is used a polymeric material which splits off nitrogen and/or water under pyrolitic conditions. Epoxy resins, melamine resins, or unsaturated hydroxyl-group-containing polyesters which have been hardened by amines and/or amides are particularly suitable, and therefore preferred, polymeric substances for this purpose.

The application of the coating is effected in known manner by dipping, impregnating and stirring. In many cases, countercurrent spraying is preferred since it provides a particularly uniformly coated powder. Fluidized-bed methods can in certain cases also give favorable results.

It is furthermore preferred to use, for at least one layer of the coating of the flame-retarding addition substances, a polymeric material which reacts endothermically with the substrate or the binder under pyrolitic conditions. There are suitable for this purpose, for instance, condensation resins of phenols with nitrogen compounds, for instance polyalkyl ureas, such as compounds of p-cresol with dimethyl urea or else $\alpha$-ureido alkylation products of phenols.

As fire-retarding addition substances for the method of the invention, there enter into consideration most substances known for this purpose, such as phosphorus compounds, polyols, amines, and/or amides. In addition, mineral, water-binding substances can also be used, such as the minerals known as "molecular sieves" (zeolites), Al(OH)$_3$, and hemihydrate. The fire-retarding phosphorus compounds tri-p-cresylphosphate, phosphorus chloride acid phenyl esters, ammonium dihydrogen phosphate, trisodiumphosphate hydrate, disodiumphenylphosphate and/or colamine phenolphthaleinphosphate are substances which are particularly well suited for the method of the invention.

The finely granular concentrates prepared in accordance with the invention can be used as fire-retarding foam-forming addition substances in thermoplastic or thermosetting plastic moldings or coating compositions, including aqueous dispersion paints.

The powders serve, for instance, for incorporation in epoxy resin compositions which are to be worked further to form flame-protected plates or sandwich structures or else tubes, particularly in petrochemistry, for instance, for refineries. Such mixtures can be employed also as gel coats, for instance, on additional resin substrates or other substrates such as wood, chipboard, or cardboard. Together with the powders described in accordance with the invention, there can readily be used additional flame-retarding substances or substances which form insulation layers, the interaction being substantially reduced by the subject matter of the invention as compared with what was previously the case.

Concentrate powders prepared in accordance with the invention can also be used in aqueous dispersion. This includes also phenol-resin dispersions which serve for the reinforcing of glass fibers and can produce a considerable amount of heat insulation in case of fire. In addition to this, it is no longer necessary to limit the amount of such dispersions used per cubic meter to a minimum, but the amount depends on the technical necessity. By varying the composition of the powder center and the surrounding outer skin, the powder can be excellently adapted to the specific purpose of use and, in addition, to the base material, which was not possible in accordance with the prior art.

The invention will be further explained by the following examples.

EXAMPLE 1

The following substances are subjected to a grinding process for 12 hours:
100 g ammonium dihydrogenphosphate
50 g pentaerythritol
30 g melamine formaldehyde resin (cured in powder form)
5 g phosphorus chloride acid phenyl ester After the grinding, the products are introduced into a 50% by weight solution of chlorinated rubber in benzene and dried in vacuum. The dried components are again ground in a ball mill to a powder having a portion of particles of a size of at most 50 μm. The maximum point of the distribution curve was at 10 μm.

The powder was mixed in an amount of 30% by weight with a p-cresol dimethylurea condensate, dried at about 150° C, again ground, again mixed with the condensate, dried and ground, and then mixed into an alkyd enamel. Coating wood with this dispersion paint gave, upon the fireproofing test in accordance with DIN 4102, a fire protection class of F50. In contradistinction to this, with the same enamel which contained the same flame protective additions in the same quantity, but not coated in accordance with the invention, a fire protection class of only F30 was obtained.

EXAMPLE 2

The following substances were ground for 24 hours in a ball mill:
150 g of monoammonium phosphate
50 g of pentaerythritol
40 g of diethylene tetramine
20 g of a chlorinated paraffin
10 g of zeolite The mass was thereupon introduced into an epoxy resin aminoamide hardener mixture having a viscosity of 500 cP and cured. 150 g of epoxy resin were used and the amount of hardener adapted to the epoxy number and amine equivalent was employed. The epoxy resin was an adduct of epichlorhydrin and bisphenol A.

After the curing, the mixture was subjected to a further fine grinding process and ground down to an average particle size of 5 μm.

Thereupon, the material was sprayed in countercurrent with a solution of an epoxy resin anhydride mixture in a ratio of 1:1 and hardened during its fall through a spray tower with a temperature of 130° C. In this way, there was produced a second outer skin around the dry concentrate powder, only a slight amount of grinding being necessary after the curing in order to separate from each other any particles which might be adhering together.

Thereupon the powder was wind-screened in order to obtain a uniform fineness.

The powder in an amount of 35% by weight was worked together with a similar epoxy resin hardener mixture to form glass fiber reinforced tubes. The tubes exhibited fire protection of class F60 in accordance with DIN 4102.

We claim:

1. A method of producing a fine granular concentrate of fire-retarding, foam-forming solids for addition to a host material including plastics, paints, coating compositions and the like which comprises, providing particles of solid fire-retarding additives of particle size less than about 5 μm, forming a mixture of said particles with a polymeric material wherein said particles are surrounded and coated by said polymeric material, said polymeric material being compatible with or the same as the host material to which the coated particles are subsequently added to confer fire-retarding and foam-forming properties thereto, comminuting said polymeric-particle mixture to a granular product of less than about 50 μm, and repeating the coating procedure at least one more time on said granular product by mixing said granular product with polymeric material, drying and comminuting said granular-polymeric mixture to provide a granular concentrate having a size of less than about 50 μm with an outer layer of said polymeric material, said polymeric material in at least the outer layer of said granular concentrate being characterized by being capable of splitting off nitrogen and/or water under pyrolitic conditions.

2. The method of claim 1, wherein said fire-retarding additives make up about 30% to 90% by weight of the final granular concentrate.

3. The method of claim 1, wherein the polymeric material is a resin selected from the group consisting of an epoxy resin hardened by amines and/or amides, a melamine resin or an unsaturated polyester resin containing hydroxyl groups.

4. The method of claim 3, wherein the polymeric material is a melamine resin.

5. The method of claim 1, wherein the mixing of said additives with the polymeric material is effected by countercurrent spraying.

6. The method according to claim 1, wherein the polymeric material used in at least one of the coating steps is one that reacts endothermically with the host material under pyrolytic conditions.

7. The method of claim 1, wherein the fire-retarding additives are at least one selected from the group consisting of phosphorus compounds, polyols, amines and/or amides, minerals and water-binding substances.

8. The method of claim 7, wherein the fire-retarding phosphorus compounds are at least one selected from the group consisting of tri-p-cresylphosphate, phosphorus chloride acid phenyl ester, ammonium dihydrogen phosphate, trisodium phosphate hydrate, disodium phenylphosphate, or colamine phenophthalein phosphate.

9. A fire-retarding, foam-forming granular concentrate prepared in accordance with the method of claim 1.

10. A method of producing a fine granular concentrate of fire-retarding, foam-forming solids for addition to a host material including plastics, paints, coating compositions and the like which comprises, providing particles of solid fire-retarding additives of particle size less than 5 μm, forming a composition by mixing said particles with a polymeric material wherein said particles are surrounded and coated by said polymeric material, said polymeric material being compatible with or the same as the host material to which the coated particles are subsequently added to confer fire-retarding and foam-forming properties thereto, forming a rolled sheet of said composition mixture, drying said sheet at a temperature less than about 200° C, comminuting said dried sheet to a granular product of less than about 50 μm, and repeating the coating procedure at least one more time on said granular product by mixing said granular product with polymeric material to provide a granular product-polymeric mixture, forming a rolled sheet of said mixture, drying and comminuting said rolled sheet to provide a granular concentrate having a size of less than about 50 μm with an outer layer of said polymeric material, said polymeric material in at least the outer layer of said granular concentrate being characterized by being capable of splitting off nitrogen and/or water under pyrolitic conditions.

11. The method of claim 10, wherein said fire-retarding additives make up about 30% to 90% by weight of the final granular concentrate.

12. The method of claim 10, wherein the polymeric material is a resin selected from the group consisting of an epoxy resin hardened by amines and/or amides, a melamine resin or an unsaturated polyester resin containing hydroxyl groups.

13. The method of claim 12, wherein the polymeric material is a melamine resin.

14. The method of claim 10, wherein the mixing of said additives with the polymeric material is effected by countercurrent spraying.

15. The method according to claim 10, wherein the polymeric material used in at least one of the coating steps is one that reacts endothermically with the host material under pyrolytic conditions.

16. The method of claim 10, wherein the fire-retarding additives are at least one selected from the group consisting of phosphorus compounds, polyols, amines and/or amides, minerals and water-binding substances.

17. The method of claim 16, wherein the fire-retarding phosphorus compounds are at least one selected from the group consisting of tri-p-cresylphosphate, phosphorus chloride acid phenyl ester, ammonium dihydrogen phosphate, trisodium phosphate hydrate, disodium phenylphosphate, or colamine phenophthalein phosphate.

18. A fire-retarding, foam-forming granular concentrate prepared in accordance with the method of claim 10.

* * * * *